(12) United States Patent
Ogiso

(10) Patent No.: US 12,554,241 B2
(45) Date of Patent: Feb. 17, 2026

(54) CONTROL DEVICE

(71) Applicant: FANUC CORPORATION, Yamanashi (JP)

(72) Inventor: Tarou Ogiso, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 138 days.

(21) Appl. No.: 18/567,770

(22) PCT Filed: Jun. 23, 2021

(86) PCT No.: PCT/JP2021/023835
§ 371 (c)(1),
(2) Date: Dec. 7, 2023

(87) PCT Pub. No.: WO2022/269819
PCT Pub. Date: Dec. 29, 2022

(65) Prior Publication Data
US 2024/0280958 A1    Aug. 22, 2024

(51) Int. Cl.
*G05B 19/404* (2006.01)
*G05B 19/416* (2006.01)

(52) U.S. Cl.
CPC ......... *G05B 19/404* (2013.01); *G05B 19/416* (2013.01); *G05B 2219/37431* (2013.01)

(58) Field of Classification Search
CPC ............... G05B 19/404; G05B 19/416; G05B 2219/37431; G05B 19/19; G05B 19/042; G01L 5/0038
USPC .................................................. 318/632, 560
See application file for complete search history.

(56) References Cited

U.S. PATENT DOCUMENTS

| | | | |
|---|---|---|---|
| 6,253,141 B1 * | 6/2001 | McCann | B60T 13/741 303/142 |
| 8,239,100 B2 * | 8/2012 | Ueno | F16D 65/18 188/72.3 |
| 10,520,054 B2 * | 12/2019 | Chandrasekara | F16D 66/024 |
| 2008/0059023 A1 | 3/2008 | Ueno et al. | |

FOREIGN PATENT DOCUMENTS

| | | |
|---|---|---|
| JP | S58-124907 A | 7/1983 |
| JP | S62-175810 A | 8/1987 |
| JP | 2008-057643 A | 3/2008 |
| JP | 2008-059016 A | 3/2008 |
| JP | 2010-041864 A | 2/2010 |

(Continued)

*Primary Examiner* — David Luo
(74) *Attorney, Agent, or Firm* — HAUPTMAN HAM, LLP

(57) ABSTRACT

This machine control device comprises an actuator that produces a thrust force, detects the thrust force of the actuator, acquires the temperature, calculates a threshold value that decreases monotonically with respect to the temperature, compares the thrust force of the actuator with the threshold value, and detects abutment when the thrust force exceeds the threshold value. This machine control device comprises an actuator that produces a thrust force, acquires the temperature, calculates a thrust force limit value that decreases monotonically with respect to the temperature, limits the thrust force of the actuator with the thrust force limit value as an upper limit, detects the speed of a part driven by the thrust force of the actuator, and detects abutment when the part has stopped.

5 Claims, 8 Drawing Sheets

(56) References Cited

FOREIGN PATENT DOCUMENTS

| | | |
|---|---|---|
| JP | 2010-066213 A | 3/2010 |
| JP | 2016-099736 A | 5/2016 |
| JP | 2020-014266 A | 1/2020 |
| JP | 2021-020507 A | 2/2021 |
| WO | 2020/105131 A1 | 5/2020 |

* cited by examiner

THRUST LIMIT VALUE CALCULATOR 23

DETECTED TEMPERATURE T → [ $a(T_0 - T) + J_{TH}$ ] → THRUST LIMIT VALUE

THRUST LIMIT VALUE CALCULATION UNIT 23

DETECTED TEMPERATURE T → [ $\dfrac{T_0 - a}{T - a} J_{TH}$ ] → THRUST LIMIT VALUE

CONTROL DEVICE

RELATED APPLICATIONS

The present application is a National Phase of International Application No. PCT/JP2021/023835 filed Jun. 23, 2021.

TECHNICAL FIELD

The present invention relates to a control device.

BACKGROUND ART

A method called abutment is used for positioning a machine. The abutment is a method of positioning a member by arranging a reference member, moving a member to be positioned, and stopping the member when the member comes into contact with the reference member.

Patent Literature 1 discloses "a machine tool including a variable speed motor that drives a movable portion, and a control mechanism that controls rotation of the variable speed motor, in which a stopper, detection means, and a position register are provided, the stopper abutting on the movable portion when the movable portion reaches a predetermined position, the detection means detecting an overcurrent flowing through the variable speed motor when the movable portion abuts on the stopper and emitting a position signal, and the position register storing the predetermined position based on the signal from the detection means and emitting a stop signal to the control mechanism based on the storage to stop the variable speed motor when the movable portion reaches the predetermined position".

CITATION LIST

Patent Literature

Patent Literature 1: JP S58-124907 A

SUMMARY OF INVENTION

Problem to be Solved by the Invention

The positioning device in Patent Literature 1 detects reaching to the stopper based on the overcurrent of the variable speed motor. However, a torque of the motor changes depending on an environment. For example, in a case where a table is moved by a screw feed mechanism as in Patent Literature 1, a viscosity of a lubricant increases as the temperature decreases, and accordingly, a friction coefficient of the screw feed mechanism increases. As a result, there is a possibility that an overcurrent is erroneously detected from a load torque before the stopper abuts. On the other hand, as the temperature increases, the viscosity of the lubricant decreases, and thus, the friction coefficient of the screw feed mechanism decreases. For this reason, it is not preferable to set a threshold for determining an overcurrent to be unnecessarily high.

Also in a hydraulic system, a load pressure of a cylinder changes depending on a temperature of a working fluid. When the temperature of the working fluid is low, the viscosity is high, and thus, the load pressure increases. When the temperature of the working fluid is high, the viscosity is low, and thus, the load pressure decreases. Therefore, in a case of determining the abutment of the stopper based on the increase in load pressure, when the temperature of the working fluid is low, the increase in load pressure before the abutment of the stopper may be erroneously determined as the abutment of the stopper. On the other hand, considering that the temperature of the working fluid is high, it is not preferable to set the load pressure for determining the abutment of the stopper to be unnecessarily high.

In the field of control devices, abutment detection adapted to a change in ambient temperature is desired.

Solution to Problem

A control device according to one aspect of the present disclosure is a control device for a machine, the control device including: an actuator that generates a thrust; a thrust detector for detecting the thrust of the actuator; a temperature acquirer for acquiring a temperature; a threshold calculator for calculating a threshold monotonically decreasing with respect to the temperature; and an abutment detector for comparing the thrust of the actuator with the threshold, and detecting abutment of a member driven by the thrust of the actuator when the thrust exceeds the threshold.

A control device according to one aspect of the present disclosure is ($ Claim 4) a control device for a machine, the control device including: an actuator for generating a thrust; a temperature acquirer for acquiring a temperature; a thrust limit value calculator for calculating a thrust limit value monotonically decreasing with respect to the temperature; a thrust limiter for limiting the thrust of the actuator with the thrust limit value as an upper limit; a speed detector for detecting a speed of a member driven by the thrust of the actuator; and an abutment detector for detecting abutment when the member stops.

Advantageous Effects of Invention

According to one aspect of the present invention, abutment can be detected in consideration of a change in ambient temperature.

MODE FOR CARRYING OUT THE INVENTION

[First Disclosure]

A control device 100 according to a first disclosure will be described with reference to the drawings.

The control device 100 is connected to or integrated with a machine, and includes a servomotor which is a type of actuator for controlling the machine. Examples of the machine to be controlled include, but are not limited to, a lathe, a drilling machine, a boring machine, a milling machine, a grinding machine, a machining center, an electrical discharge machine, and an injection molding machine.

The control device 100 according to the present disclosure controls an actuator. A control target of the control device is a machine including an actuator. Examples of the actuator include, but are not limited to, a servomotor using electricity as a power source, a stepping motor, a linear motor, a hydraulic cylinder using a hydraulic pressure as a power source, a hydraulic motor, a pneumatic cylinder operated by high-pressure air, and a pneumatic motor.

Figure 1:
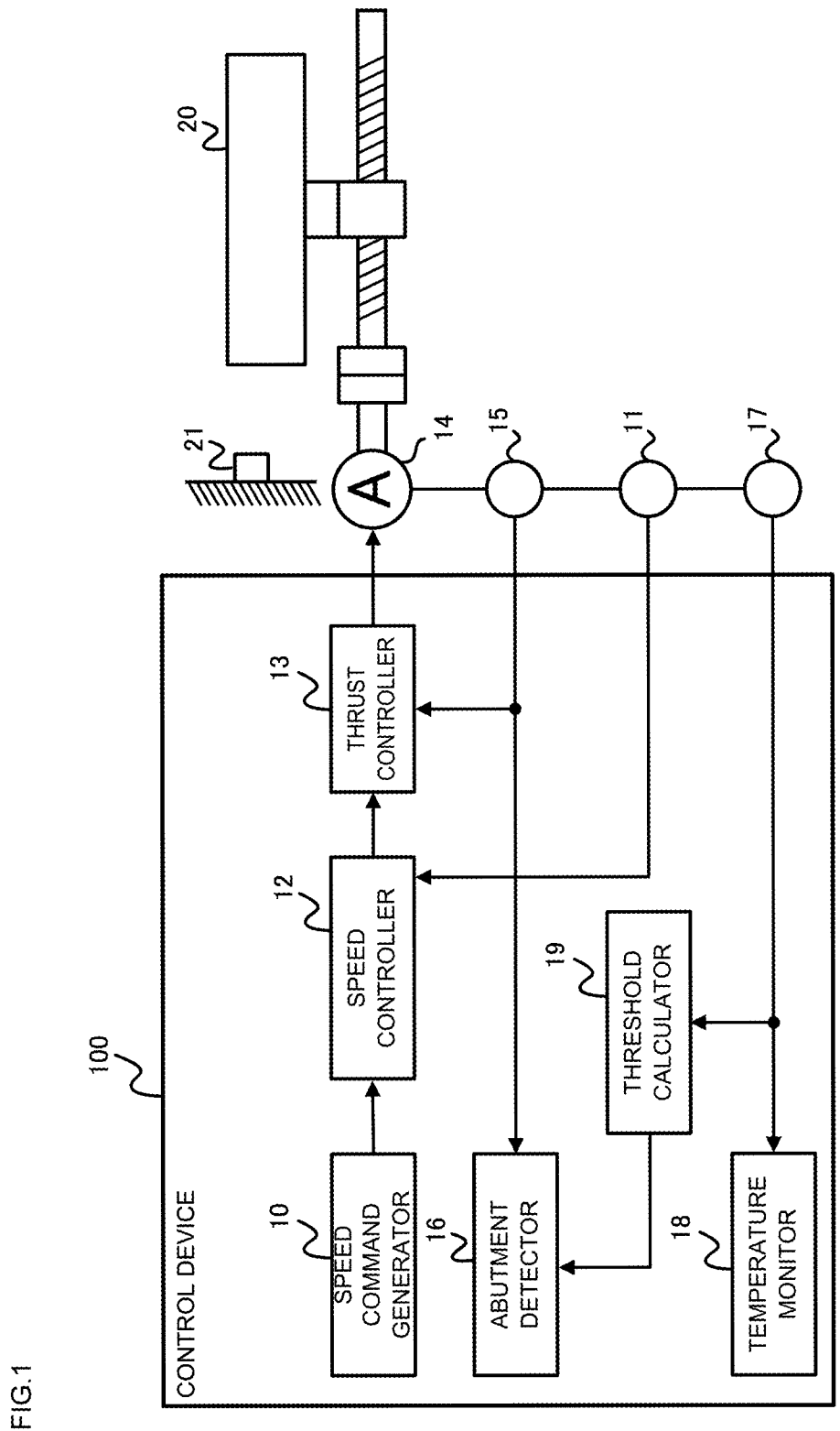
FIG. 1 is a block diagram of a control device according to the first disclosure.

FIG. 1 is a block diagram of the control device 100 for detecting abutment of a table 20. The control device 100 includes a speed command generator 10, a speed detector 11, a speed controller 12, a thrust controller 13, an actuator 14, a thrust (current) detector 15, an abutment detector 16, a temperature acquirer 17, a temperature monitor 18, and a threshold calculator 19.

The speed command generator 10 outputs a speed command signal for the table 20. The speed detector 11 detects a speed of the table 20. The speed controller 12 outputs a thrust command to the thrust controller 13 in such a way that the speed of the table 20 follows the speed command. The thrust controller 13 controls a thrust of the actuator to follow the thrust command. For example, in a case where the actuator 14 is a servomotor, the thrust controller 13 supplies a current to the actuator 14. The actuator 14 drives a screw feed mechanism. The table 20 moves at a predetermined speed by a thrust of the screw feed mechanism.

At the time of abutment detection, the control device 100 moves the table 20 toward the stopper 21. When the table 20 abuts on the stopper 21, the table 20 stops. When the table 20 stops, the thrust (current) of the actuator 14 increases. The thrust (current) detector 15 detects the increase in thrust. The abutment detector 16 compares the increased thrust with a threshold, and outputs a signal to the speed command generator 10 to stop the table 20 in a case where the thrust of the actuator 14 exceeds the threshold. As a result, the abutment ends.

The temperature acquirer 17 acquires a detected temperature T from the machine itself or a temperature sensor outside the machine. In the present disclosure, the detected temperature T is acquired by using a temperature sensor provided in advance in the machine, and thus, it is not necessary to provide a new temperature sensor. A new temperature sensor may be provided for the abutment detection.

Existing temperature sensors include the following.

(1) Thermometer in a factory: A thermometer is installed in a factory that handles precision machines and foods. In addition, a thermometer may be installed to maintain the safety and health of workers. The temperature acquirer 17 acquires the detected temperature T from an existing thermometer provided outside the machine.

(2) Heating cylinder in an injection molding machine: A heating cylinder in an injection molding machine is provided with a temperature sensor. Since the heating cylinder of the injection molding machine melts a plastic material by applying heat to the plastic material, the heating cylinder has a high temperature during processing. However, the heating cylinder is not in a heated state when the injection molding machine is started. Therefore, it can be expected that the detected temperature T is equivalent to an ambient temperature. The same applies to plastic processing machines other than the injection molding machine.

(3) Oil thermometer in a hydraulic system: It is common to provide a temperature sensor to monitor overheating of a hydraulic oil.

(4) Temperature sensor in a control panel: A control panel contains many devices. In order to prevent malfunction due to a high temperature and deterioration of the devices, a temperature sensor may be installed on the control panel. Although the detected temperature T becomes higher as the machine is operated, it can be expected that the detected temperature T is equivalent to the ambient temperature when the machine is started.

(5) Temperature sensor in a servomotor: A servomotor generally includes a temperature sensor in order to monitor the temperature to prevent the temperature from exceeding the maximum allowable temperature defined by an insulation class. Although the detected temperature T becomes higher as the machine is operated, it can be expected that the detected temperature T is equivalent to the ambient temperature when the machine is started. Even an electric motor other than the servomotor may include a temperature sensor.

The temperature acquirer 17 may obtain calendar information from the control device itself or the outside of the control device, and acquire a temperature associated with the calendar information in advance as the detected temperature T. Here, the calendar information indicates a date or time. For example, a relatively high temperature associated with summer is set as the detected temperature T, and a relatively low temperature associated with winter is set as the detected temperature T. For example, a relatively high temperature associated with daytime is set as the detected temperature T, and a relatively low temperature associated with nighttime is set as the detected temperature T.

As for the association between the calendar information and the temperature, a binary value of summer or winter may be determined from the date, and the temperature associated with each of summer and winter may be acquired as the detected temperature T, or a plurality of grades may be provided for a date change from summer to winter, and a temperature associated with each grade may be acquired as the detected temperature T. Similarly, a binary value of daytime or nighttime may be determined from the time, and a temperature associated with each of daytime and nighttime may be acquired as the detected temperature T, or a plurality of grades may be provided for a time change from daytime to nighttime, and a temperature associated with each grade may be acquired as the detected temperature T.

In the present disclosure, the detected temperature T is a value for calculating a threshold or a limit value for the thrust. Therefore, in the association between the calendar information and the temperature, the temperature is merely a parameter. Therefore, the present disclosure also includes a mode of estimating the temperature from the calendar information and calculating the threshold for the thrust or a thrust limit value as described below.

The temperature monitor 18 monitors the temperature acquired by the temperature acquirer 17.

Figure 2:
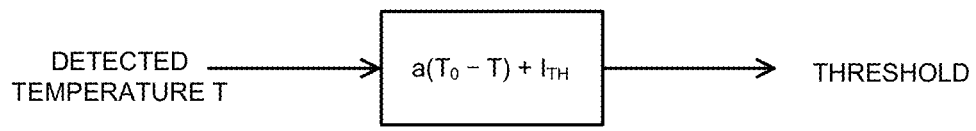
FIG. 2 is a graph showing a relationship between a threshold and a detected temperature.
Figure 2:
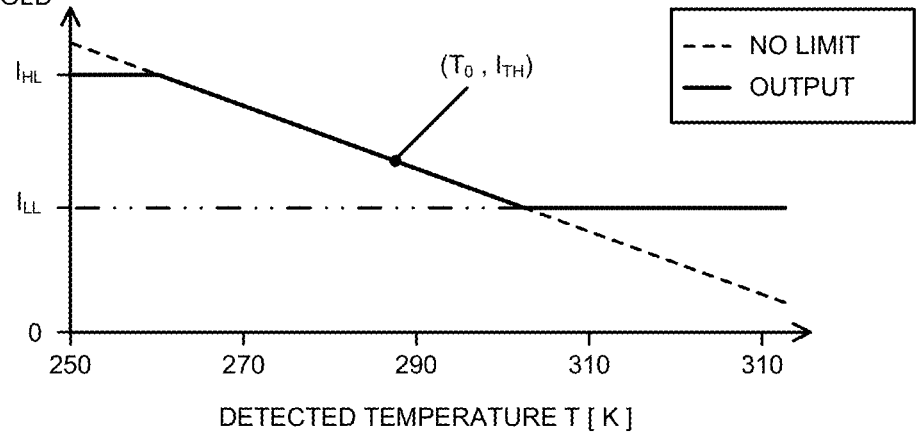
Figure 3:
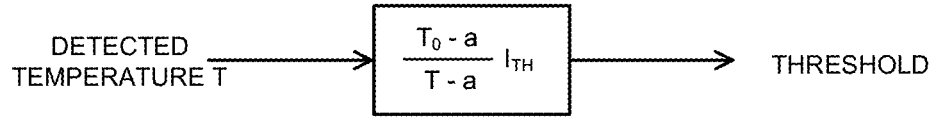
FIG. 3 is a graph showing a relationship between the threshold and the detected temperature.
Figure 3:
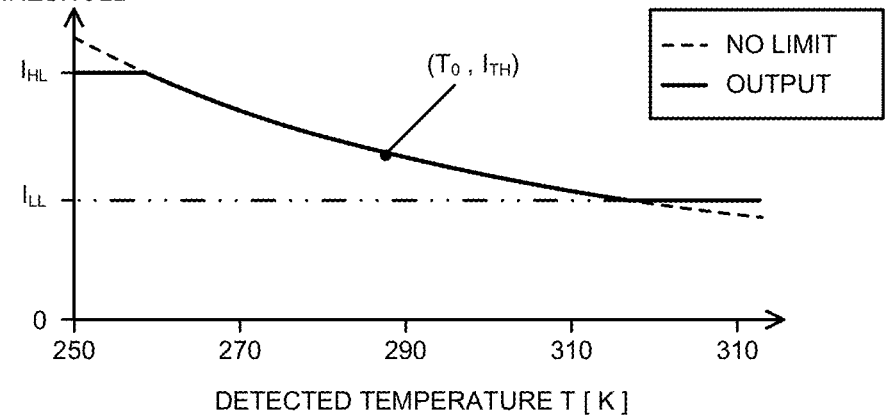

The threshold calculator 19 calculates a threshold for abutment detection based on the detected temperature T acquired by the temperature acquirer 17. The graphs in FIGS. 2 and 3 show a relationship between the threshold and the temperature. As for an expression for calculating the threshold, it is sufficient if the threshold monotonically decreases with respect to the temperature, and the expression is not limited to examples of FIGS. 2 and 3.

The detected temperature T in the graphs is an absolute temperature. The reason why the detected temperature T is an absolute temperature is that it is not necessary to consider a change in sign. The detected temperature T is not necessarily an absolute temperature.

FIG. 2 is an example of a linear expression with a negative slope. The expression of the graph indicated by the dotted line is $a(T_0-T)+I_{TH}$ (where, $T_0$: a reference temperature [K] (about 293 K), a: a parameter for adjusting sensitivity to a temperature change, and $I_{TH}$: a threshold at the reference temperature).

FIG. 3 is an example of an inverse proportion expression. The expression of the graph indicated by the dotted line is $[(T_0-a)/(T-a)] \times I_{TH}$ (where $T_0$: a reference temperature [K] (about 293 K), a: a parameter for adjusting sensitivity to a temperature change, and $I_{TH}$: a threshold at the reference temperature).

In the examples of FIGS. 2 and 3, an upper limit value $I_{HL}$ and a lower limit value $I_{LL}$ are provided for the threshold. The graph indicated by the solid line in each of FIGS. 2 and 3 is an output in a case where the calculated value is limited by the upper limit value $I_{HL}$ and the lower limit value $I_{LL}$. The upper limit value $I_{HL}$ is a threshold in a case where a cold day is assumed, and the lower limit value $I_{LL}$ is a threshold in a case where a hot day is assumed.

Figure 4:
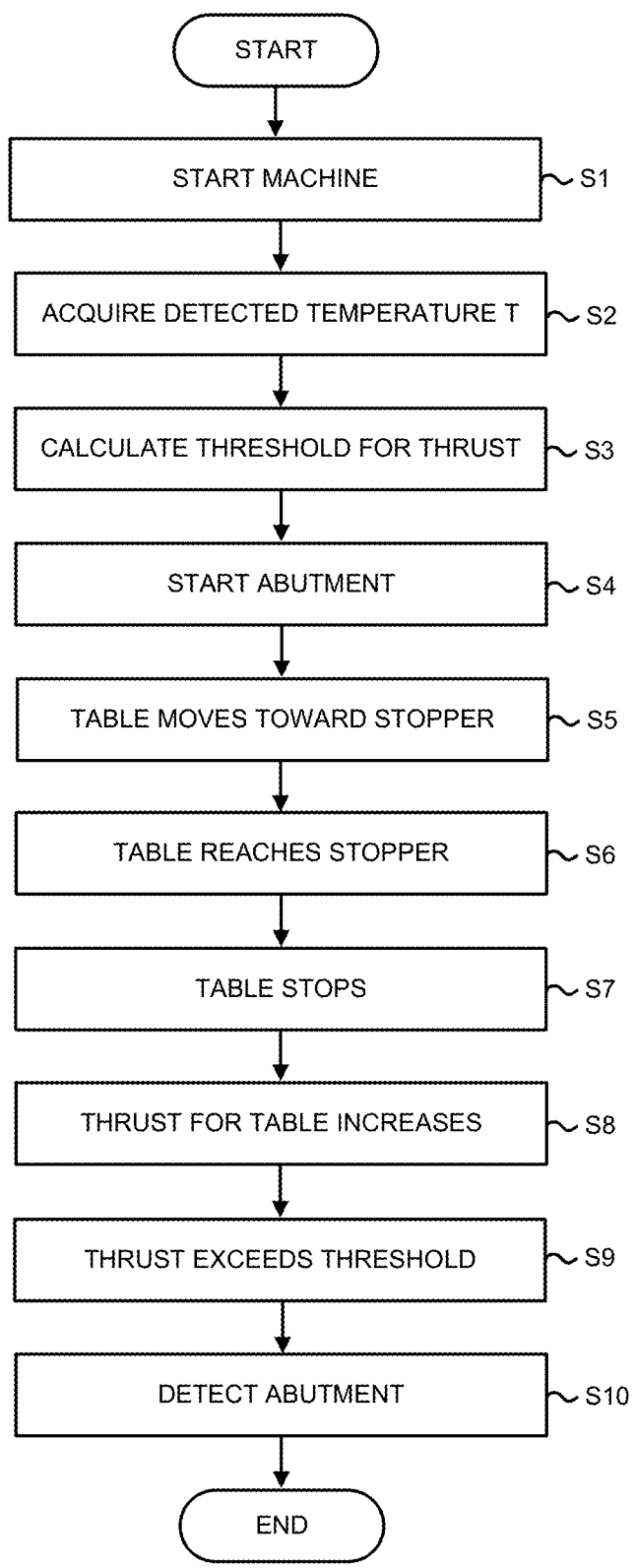
FIG. 4 is a flowchart for illustrating an operation of the control device according to the first disclosure.

Hereinafter, an operation of the control device 100 according to the first disclosure will be described with reference to FIG. 4.

When an operator starts the machine (step S1), the temperature acquirer 17 acquires the detected temperature T at the time of start (step S2). The threshold calculator 19 calculates the threshold for the thrust for detecting abutment based on the detected temperature T (step S3). The threshold for the thrust monotonically decreases with respect to the detected temperature T.

When the operator instructs the start of the abutment detection (step S4), the table 20 moves toward the stopper 21 (step S5). Once the table 20 reaches the stopper 21 (step S6), the table 20 stops (step S7), and the thrust of the actuator 14 increases (step S8).

The abutment detector 16 compares the threshold calculated by the threshold calculator 19 with the thrust detected by the thrust (current) detector 15, and detects, in a case where the thrust exceeds the threshold (step S9), that the table 20 has reached the stopper 21 (abutment) (step S10).

The control device 100 according to the first disclosure increases the threshold at a low temperature. At a low temperature, the viscosity of a lubricant increases, and a relatively high thrust is thus required to move the table 20. In the first disclosure, by increasing the threshold at a low temperature, it is possible to prevent the thrust required for moving the table at a low temperature from being erroneously detected as "abutment".

The control device 100 according to the first disclosure decreases the threshold at a high temperature. In a case where the threshold is high, the thrust acts on the stopper 21 until the thrust reaches the threshold. In the first disclosure, an excessive contact force is not applied to the stopper 21 by decreasing the threshold at a high temperature.

The control device 100 according to the present disclosure performs not only threshold adjustment but also speed control. In a case where "abutment" is made without controlling or limiting the speed, there is a possibility that the speed when the table 20 comes into contact with the stopper 21 becomes excessively high. The control device according to the present disclosure controls the speed of the table 20 to prevent collision between the table 20 and the stopper 21.

In the above-described flowchart, the detected temperature T is acquired when the machine is started, but the order of the processing is not limited thereto. In a case where the detected temperature T matching the ambient temperature can be acquired even after the machine is operated, the detected temperature may be acquired or the threshold may be calculated after instructing the start of the abutment detection.

[Second Disclosure]

Next, a control device 100 according to the second disclosure will be described.

Figure 5:
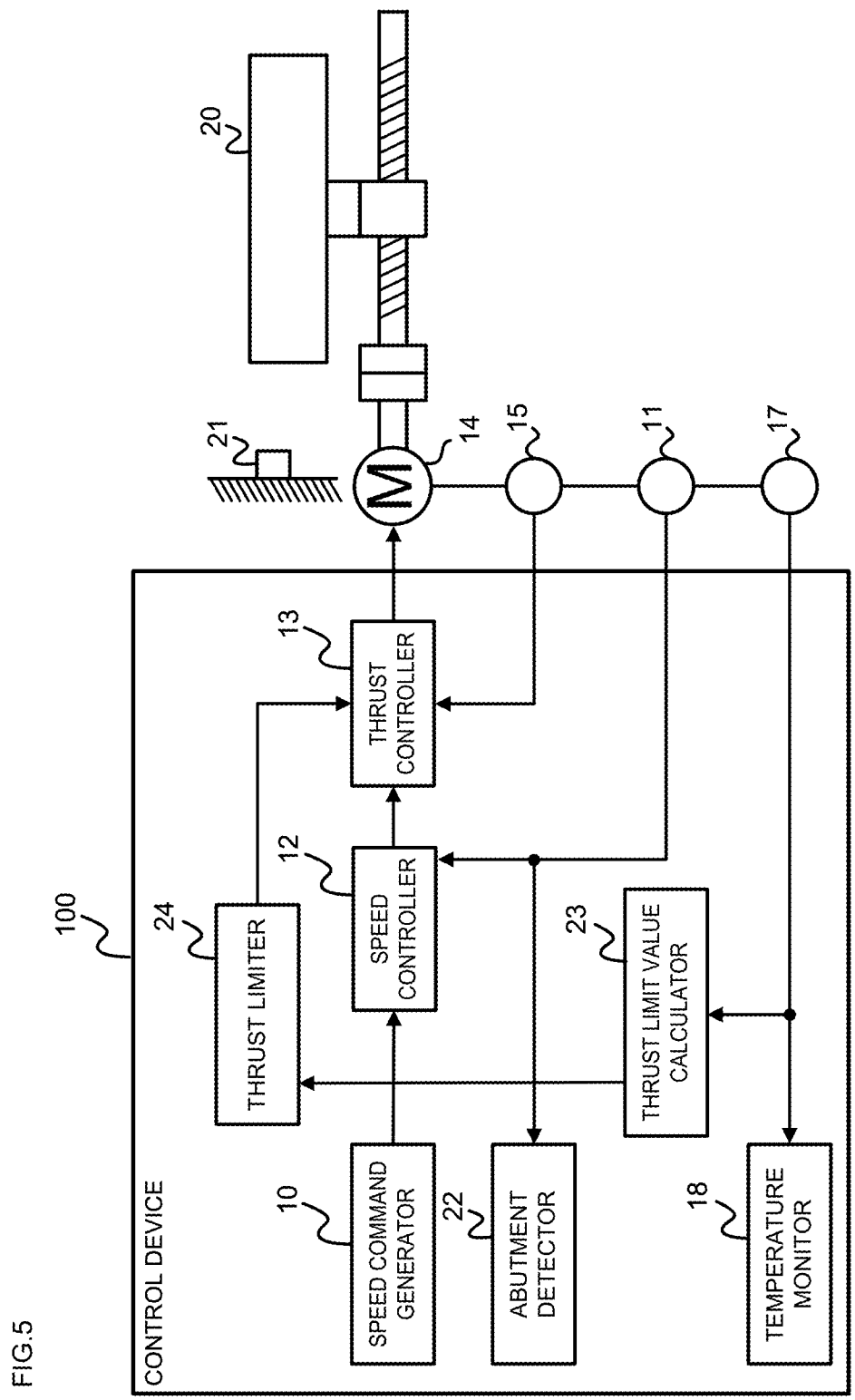
FIG. 5 is a block diagram of a control device according to a second disclosure.

FIG. 5 is a block diagram of the control device 100 according to the second disclosure. The control device 100 according to the second disclosure includes a speed command generator 10, a speed detector 11, a speed controller 12, a thrust controller 13, an actuator 14, a thrust (current) detector 15, a temperature acquirer 17, a temperature monitor 18, an abutment detector 22, a thrust limit value calculator 23, and a thrust limiter 24.

The speed command generator 10 outputs a speed command signal for the table 20. The speed detector 11 detects a speed of the table 20. The speed controller 12 outputs a thrust command to the thrust controller 13 in such a way that the speed of the table 20 follows the speed command. The thrust controller 13 controls a thrust of the actuator to follow the thrust command. For example, in a case where the actuator 14 is a servomotor, the thrust controller 13 supplies a current to the actuator 14. The actuator 14 drives a screw feed mechanism. The table 20 moves at a predetermined speed by the thrust of the actuator 14.

The temperature acquirer 17 acquires a detected temperature T from a temperature sensor provided inside or outside the machine. The temperature monitor 18 monitors the temperature acquired by the temperature acquirer 17 and performs temperature control in such a way that the machine does not overheat. A method for the temperature control varies depending on a type of the machine.

Since the functions of the speed command generator 10, the speed detector 11, the speed controller 12, the thrust controller 13, the actuator 14, the thrust (current) detector 15, the temperature acquirer 17, and the temperature monitor 18 of the control device 100 according to the second disclosure are similar to those in the first disclosure, these units are denoted by the same reference numerals.

The thrust (current) detector 15 calculates a thrust limit value. The thrust limit value is a limit value for a thrust for moving a member of the machine. The thrust limiter 24 controls the thrust for the table 20 to be equal to or less than the thrust limit value.

Figure 6:
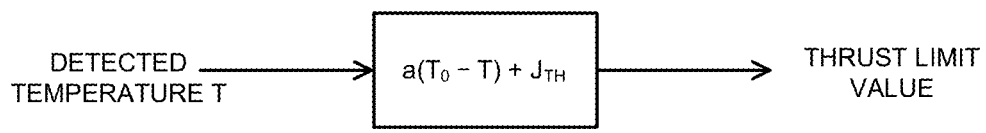
FIG. 6 is a graph showing a relationship between a thrust limit value and a detected temperature.
Figure 6:
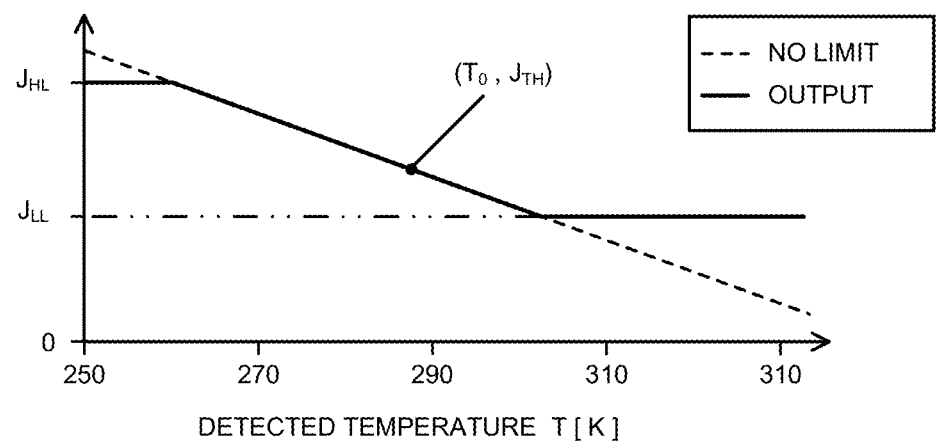
Figure 7:
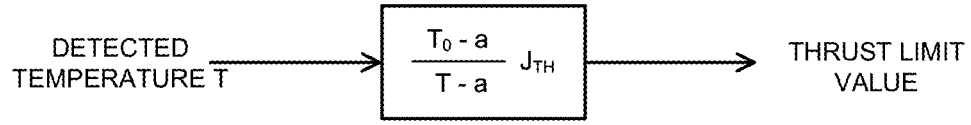
FIG. 7 is a graph showing the relationship between the thrust limit value and the detected temperature.
Figure 7:
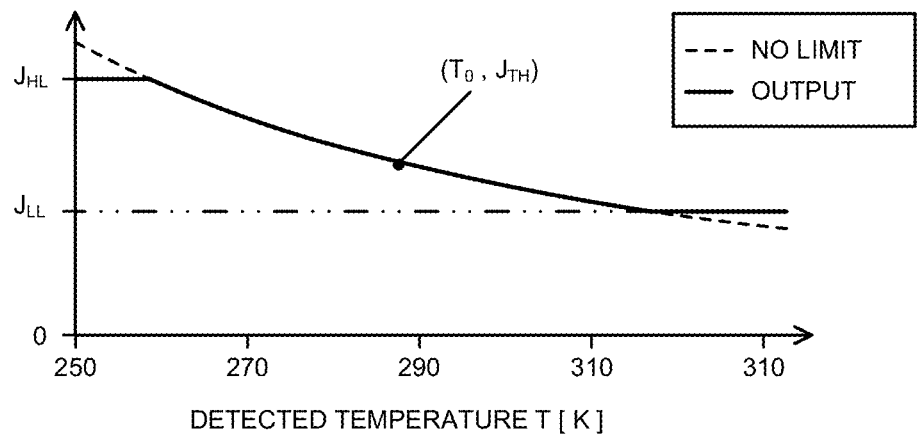

The graphs in FIGS. 6 and 7 show a relationship between the thrust limit value and the temperature. As for an expression for calculating the thrust limit value, it is sufficient if the thrust limit value monotonically decreases with respect to the temperature, and the expression is not limited to examples of FIGS. 6 and 7.

FIG. 6 is an example of a linear expression with a negative slope. The expression of the graph indicated by the dotted line is $a(T_0-T)+J_{TH}$ (where, $T_0$: a reference temperature [K] (about 293 K), a: a parameter for adjusting sensitivity to a temperature change, and $J_{TH}$: a thrust limit value at the reference temperature).

FIG. 7 is an example of an inverse proportion expression. The expression of the graph indicated by the dotted line is $[(T_0-a)/(T-a)] \times J_{TH}$ (where, $T_0$: a reference temperature [K] (about 293 K), a: a parameter for adjusting sensitivity to a temperature change, and $J_{TH}$: a thrust limit value at the reference temperature).

In the examples of FIGS. 6 and 7, an upper limit value $J_{HL}$ and a lower limit value $J_{LL}$ are provided for the thrust limit value. The graph indicated by the solid line in each of FIGS. 6 and 7 is an output in a case where the calculated value is limited by the upper limit value $J_{HL}$ and the lower limit value $J_{LL}$. The upper limit value $J_{HL}$ is a thrust limit value in a case where a cold day is assumed, and the lower limit value $J_{LL}$ is a thrust limit value in a case where a hot day is assumed.

The abutment detector 22 acquires the speed of the table 20 from the speed detector 11. The abutment detector 22 monitors the speed, and detects abutment of the table 20 when the table 20 stops. For example, in a case where the speed acquired from the speed detector 11 is zero for a certain period of time, the abutment detector 22 considers that the table 20 has stopped.

Figure 8:
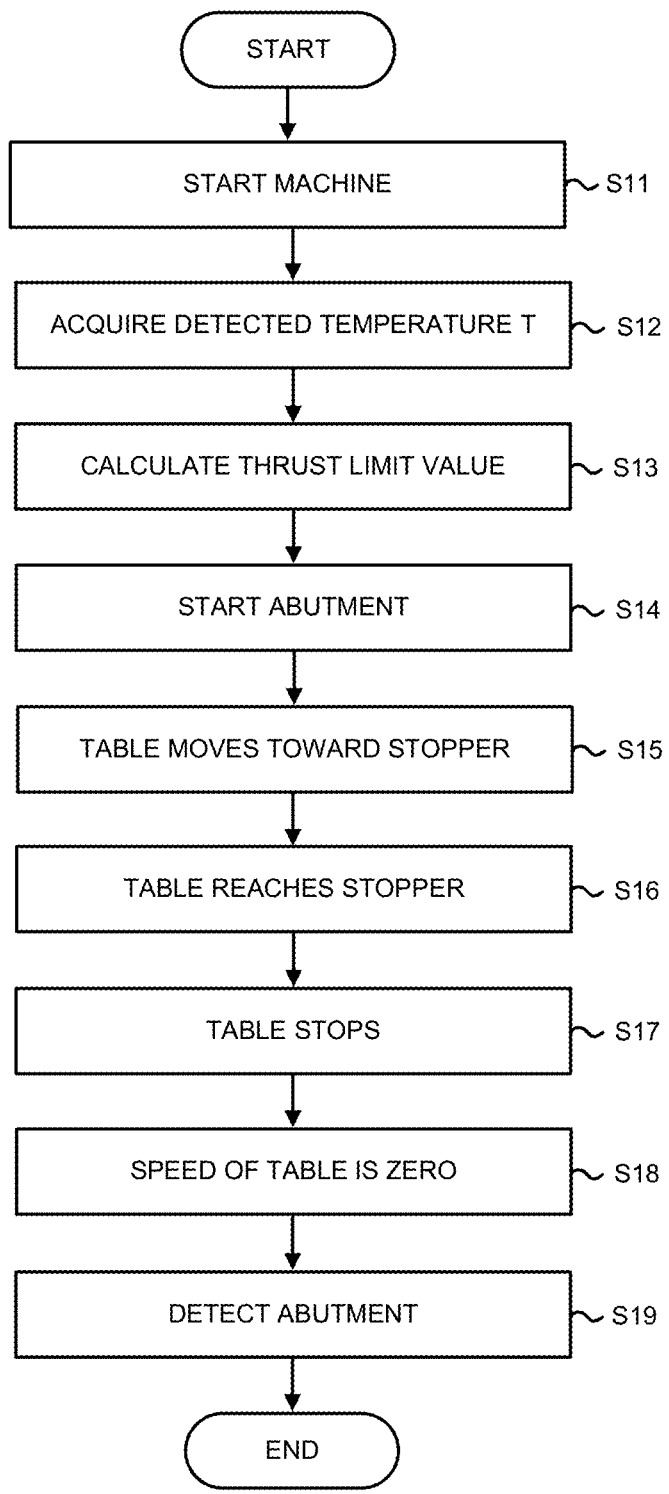
FIG. 8 is a flowchart for illustrating an operation of the control device according to the second disclosure.

Hereinafter, an operation of the control device 100 according to the second disclosure will be described with reference to FIG. 8.

When an operator starts the machine (step S11), the temperature acquirer 17 acquires the detected temperature T at the time of start (step S12). The thrust limit value calculator 23 calculates the thrust limit value for moving the table 20 based on the detected temperature T (step S13). The thrust limit value monotonically decreases with respect to the detected temperature T.

When the operator instructs the start of the abutment detection (step S14), the table 20 moves toward the stopper 21 (step S15). At this time, the higher the detected temperature T, the lower the thrust limit value is, and the lower the detected temperature T, the higher the thrust limit value is. That is, the lower the detected temperature T, the higher the thrust can be output.

Once the table 20 reaches the stopper 21 (step S16), the table 20 stops (step S17). When the speed of the table 20 becomes zero (step S18), the abutment detector 22 detects abutment (step S19).

The control device 100 according to the second disclosure changes the thrust limit value according to the temperature. At a low temperature, the thrust limit value increases, so that a high thrust can be output. If a sufficiently high thrust can be output, the table 20 does not stop even when the viscosity of the lubricant is high at a low temperature. Once the table 20 reaches the stopper 21, the table 20 stops. In the control device 100 according to the second disclosure, the thrust for the table 20 is sufficiently high, so that the stop of the table 20 due to an insufficient thrust is avoided, and the abutment is detected based on the speed of the table 20.

The control device 100 according to the second disclosure decreases the thrust limit value at a high temperature to limit the thrust at a high temperature. By limiting the thrust for the table 20, collision between the table 20 and the stopper 21 at a high temperature is avoided.

In the above-described flowchart, the detected temperature T is acquired when the machine is started, but the order of the processing is not limited thereto. In a case where the detected temperature T matching the ambient temperature can be acquired even after the machine is operated, the detected temperature may be acquired after an instruction to start abutment detection, or the thrust limit value may be calculated if the detected temperature is acquired.

Example of Abutment

Figure 9:
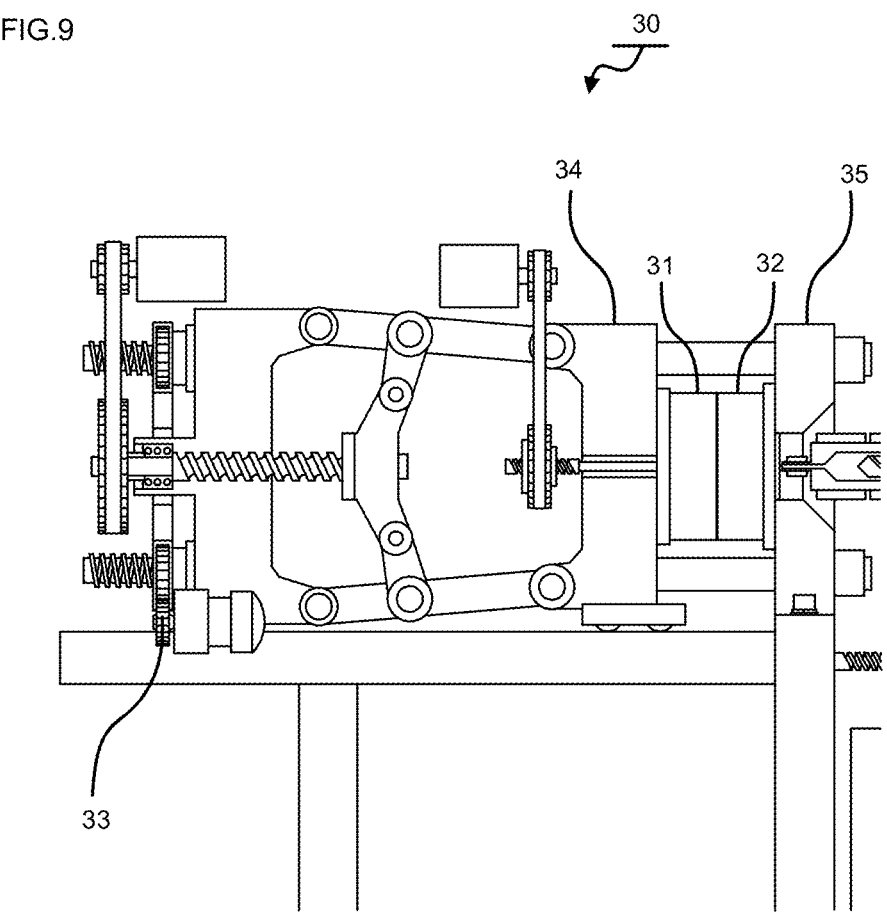
FIG. 9 is a view illustrating an example in which abutment detection according to the present disclosure is applied to an injection molding machine.
Figure 10:
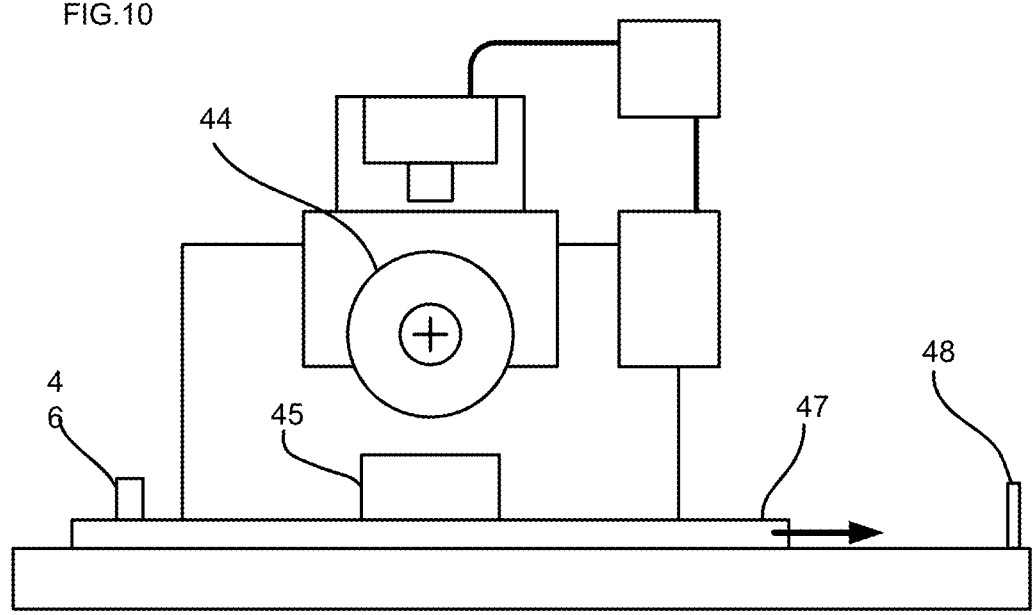
FIG. 10 is a view illustrating an example in which the abutment detection according to the present disclosure is applied to a grinder.

Referring to FIGS. 9 and 10, an example in which the present disclosure is applied to a machine different from those of the first disclosure and the second disclosure will be described.

FIG. 9 is a clamping mechanism 30 in an injection molding machine. The clamping mechanism 30 includes a movable platen 34 and a fixed platen 35. A movable mold 31 and a fixed mold 32 are attached to the movable platen 34 and the fixed platen 35, respectively. The clamping mechanism 30 includes a mold thickness adjustment motor 33 as an actuator. A mold touch indicates an operation in which the mold thickness adjustment motor 33 causes the movable mold 31 to move forward and abut on the fixed mold 32.

In a case where the first disclosure is applied to the mold touch of the injection molding machine, the threshold calculator 19 calculates the threshold of the abutment detector 16 based on the detected temperature T. The movable mold 31 moves toward the fixed mold 32, and when the movable mold 31 and the fixed mold 32 come into contact with each other, the movable mold 31 stops moving forward. When the movable mold 31 stops, the thrust (current) of the mold thickness adjustment motor 33 increases. The abutment detector 16 compares the value of the increased thrust with the threshold, and detects abutment when the thrust of the mold thickness adjustment motor 33 exceeds a predetermined threshold.

In a case where the second disclosure is applied to the mold touch of the injection molding machine, the thrust limit value calculator 23 calculates the thrust limit value based on the detected temperature T. The control device 100 moves the movable mold 31 toward the fixed mold 32 while limiting the thrust to be equal to or less than the thrust limit value. When the movable mold 31 comes into contact with the fixed mold 32, the movable mold 31 stops, and the speed of the movable mold 31 becomes zero. The abutment detector 22 detects the abutment from the stop of the movable mold 31.

FIG. 10 illustrates a grinding machine. The grinding machine grinds a workpiece 45 with a grindstone 44. A dresser 46 is attached to a table 47 on which the workpiece 45 is placed. The table 47 moves to the left and right in the drawing. When dressing is performed, the table 47 moves to the right in the drawing, and the dresser 46 moves below the grindstone 44. The grindstone 44 rotates to be polished by the dresser 46. Abutment is used to position the dresser 46. The table 47 moves toward the stopper 48, and the table 47 moves to the position of the stopper 48.

In a case where the first disclosure is applied to the abutment of the grinding machine, the threshold calculator 19 calculates the threshold of the abutment detector 16 based on the detected temperature T. The table 47 moves toward the stopper 48, and when the table 47 and the stopper 48 come into contact with each other, the table 47 stops. When the table 47 stops, the thrust (current) of the actuator 14 increases. The abutment detector 16 compares the value of the increased thrust with a threshold, and stops the table 47 when the thrust of the actuator 14 exceeds the threshold.

In a case where the second disclosure is applied to the abutment of the grinding machine, the thrust limit value calculator 23 calculates the thrust limit value based on the detected temperature T. The control device 100 moves the table 47 toward the stopper 48 while limiting the thrust. When the table 47 comes into contact with the stopper 48 and stops, the speed of the table 47 becomes zero. The abutment detector 22 detects the abutment from the stop of the table 47.

Figure 11:
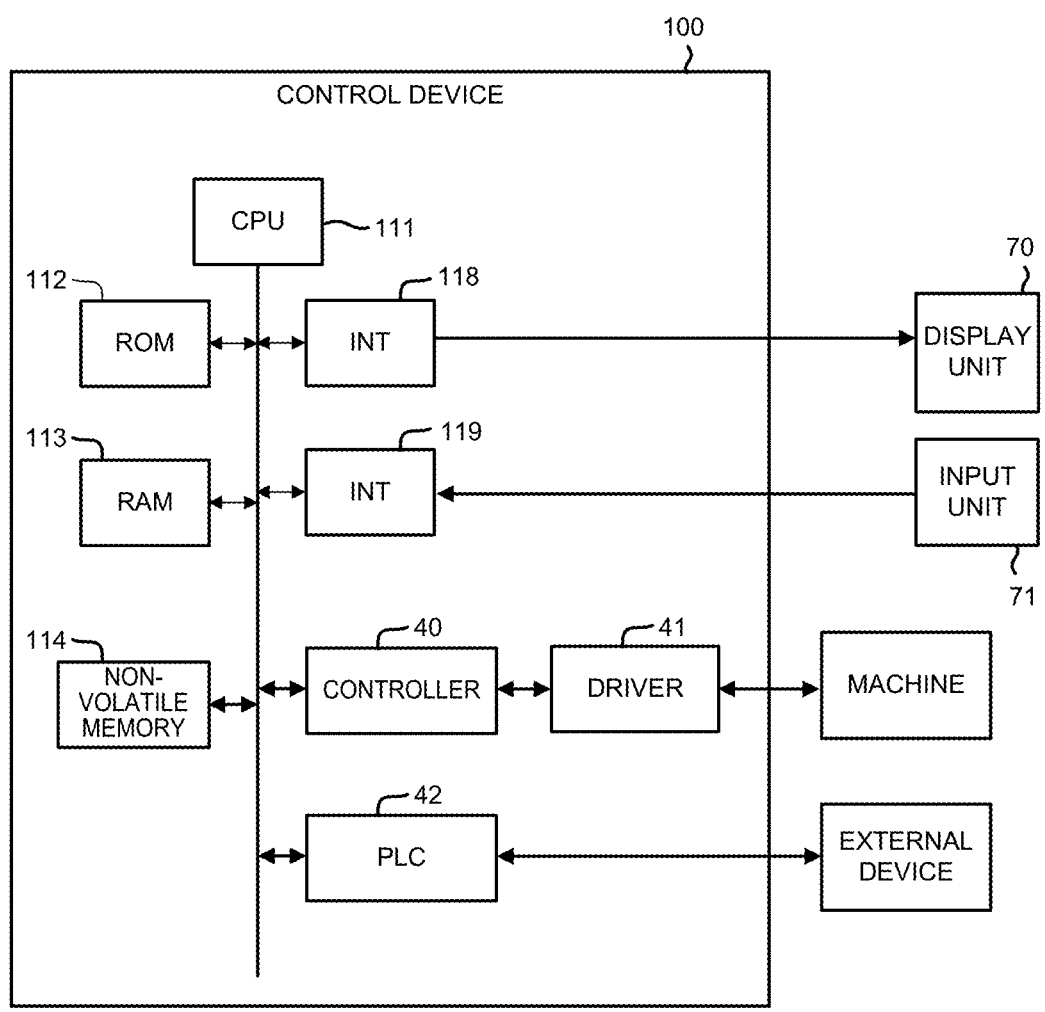
FIG. 11 is a diagram illustrating a hardware configuration of the control device.

With reference to FIG. 11, an example of a hardware configuration of the control device 100 for controlling a machine will be described. A central processing unit (CPU) 111 included in the control device 100 is a processor for controlling the entire control device 100. The CPU 111 reads a processed system program in a ROM 112 via a bus, and controls the entire control device 100 according to the system program. A RAM 113 temporarily stores temporary calculation data, display data, various data input by a user via an input unit 71, and the like.

A display unit 70 is a monitor or the like attached to the control device 100. The display unit 70 displays an operation screen, a setting screen, and the like for the control device 100.

The input unit 71 is a keyboard, a touch panel, or the like integrated with the display unit 70 or separated from the display unit 70. The user operates the input unit 71 to perform input to the screen displayed on the display unit 70 or the like. The display unit 70 and the input unit 71 may be mobile terminals.

A non-volatile memory 114 is, for example, a memory that is backed up by a battery, not shown, or the like and maintains a storage state even when a power supply of the control device 100 is turned off. The non-volatile memory 114 stores a program read from an external device via an interface, not shown, a program input via the input unit 71, and various data acquired from each unit of the control device 100, a machine tool, or the like (for example, setting parameters acquired from a machine, and the like). The programs and various data stored in the non-volatile memory 114 may be loaded into the RAM 113 at the time of execution or use. In addition, various system programs are written in the ROM 112 in advance.

A controller 40 that controls a machine outputs a command from the CPU 111 to a driver 41. The driver 41 drives an actuator of the machine. The actuator drives a member of the machine under the control of the control device 100.

The control device 100 is connected to an external device such as a temperature sensor via a programmable logic controller (PLC) 42, and acquires the detected temperature T.

EXPLANATION OF REFERENCE NUMERALS

100 Control device
10 Speed command generator
11 Speed detector
12 Speed controller
13 Thrust controller
14 Actuator
15 Thrust (current) detector
16 Abutment detector
17 Temperature acquirer
18 Temperature monitor
19 Threshold calculator
20 Table
21 Stopper
22 Abutment detector
23 Thrust limit value calculator
24 Thrust limiter

111 CPU
112 ROM
113 RAM
114 Non-volatile memory

The invention claimed is:

1. A control device for positioning a machine by abutting a member to be positioned on a reference member, the control device comprising:
    an actuator configured to generate a thrust to drive the member to be positioned;
    a thrust detector configured to detect the thrust of the actuator;
    a temperature acquirer configured to acquire a temperature;
    a threshold calculator configured to calculate a threshold monotonically decreasing with respect to the temperature; and
    an abutment detector configured to
        compare the thrust of the actuator with the threshold, and
        in response to the thrust exceeding the threshold, detect abutment of the member to be positioned on the reference member to position the machine, the member to be positioned being driven by the thrust of the actuator.

2. A control device for a machine, the control device comprising:
    an actuator for generating a thrust;
    a thrust detector for detecting the thrust of the actuator;
    a temperature acquirer for acquiring a temperature;
    a threshold calculator for calculating a threshold monotonically decreasing with respect to the temperature;
    an abutment detector for comparing the thrust of the actuator with the threshold, and detecting abutment of a member driven by the thrust of the actuator when the thrust exceeds the threshold;
    a speed command generator for generating a speed command for the actuator or the member;
    a speed detector for detecting an actual speed of the actuator or the member;
    a speed controller for outputting a thrust command in such a way that the actual speed follows the speed command; and
    a thrust controller for controlling the thrust to follow the thrust command output from the speed controller,
    wherein speed control for the actuator or the member is performed.

3. The control device according to claim 2, wherein the temperature acquirer acquires the temperature from a temperature sensor provided in the machine or the control device.

4. A control device for a machine, the control device comprising:
    an actuator for generating a thrust;
    a temperature acquirer for acquiring a temperature;
    a thrust limit value calculator for calculating a thrust limit value monotonically decreasing with respect to the temperature;
    a thrust limiter for limiting the thrust of the actuator with the thrust limit value as an upper limit;
    a speed detector for detecting a speed of a member driven by the thrust of the actuator; and
    an abutment detector for detecting abutment when the member stops.

5. The control device according to claim 4, wherein the temperature acquirer acquires the temperature from a temperature sensor provided in the machine or the control device.

\* \* \* \* \*